Patented Feb. 25, 1941

2,232,931

UNITED STATES PATENT OFFICE 2,232,931

METHOD OF TREATING WELLS

John B. Stone, Tulsa, Okla., and Paul G. Shelley, Midland, Mich., assignors to The Dow Chemical Company, Midland, Mich., a corporation of Michigan No Drawing. Application March 23, 1938, Serial No. 197,610

4 Claims. (Cl. 166—21)

The invention relates to the treatment of wells, more particularly those yielding oil or gas from a calcareous formation.

The well known method of treatment of oil and gas wells in calcareous formations consists in injecting into the producing formation aqueous hydrochloric acid which has the effect of attacking and dissolving the rock formation, forming flow passages therein which facilitate the delivery of oil or gas to the well. In applying this method we have found that the desired increased rate of production is not always obtained. This may be due to a number of causes, some of which are beyond control. In many cases, however, we have found that the response of the well to the treatment depends upon the manner in which the acid acts upon the formation, and this is susceptible of control according to our discovery. In the case where the formation is quite soluble in the acid, such as when the formation is composed largely of limestone, the acid acts relatively rapidly upon that part of the formation immediately surrounding the well bore. As a consequence only the pores or channels in the immediate vicinity of the well bore become enlarged, those lying beyond being substantially unaffected by the acid since it becomes spent before any deep penetration can be effected.

The principal object of our invention is to provide an improved method of acid treating a well in a calcareous oil or gas producing formation whereby the action of the acid is so controlled as to reduce its rate of action and thereby permit relatively deep penetration to the more remote portions of the producing horizon before the acid becomes spent. A further object is to provide a method of acid treating a well in a calcareous oil or gas producing formation whereby relatively long flow channels are created or enlarged therein without employing an excessively large volume of acid. Other objects and advantages will appear as the description of the invention proceeds.

We have discovered that by including in the hydrochloric acid solution, which is introduced into the well and thence into the formation, a relatively small proportion of certain organic nitrogen compounds selected from the group consisting of dibutyl amine, cinchophen, nitrobenzene, p-nitrophenol, diphenyl guanidine, 4-tertiary-butyl-2-nitrophenol, 2-chlor-5-nitrobenzoic acid, 3-nitro-diphenyl ether 2 sulfonic acid, 2-chloro-nitrobenzene, 2-nitrobenzoic acid, ortho-nitro-para phenetedine, the rate of action of the acid upon limestone is greatly reduced when the reaction is carried out under the pressure existing in deep wells, as for example, at pressures of about 300 to 600 pounds per square inch or more. At these pressures the addition of any of the aforesaid compounds in relatively small amount, that is from 0.1 to 5 per cent, greatly reduces the rate of action of the acid and thereby permits it to be forced deeply into the formation before it becomes neutralized. By using such agents in the acid introduced into the well, it is possible to enlarge and greatly extend existing flow channels as well as to create new ones through those portions of the earth or rock which are sufficiently porous to admit the acid where ordinary hydrochloric acid would become spent in a relatively short time. We have found that, as a result of such treatments, greatly increased production is obtainable and that, contrary to the usual phenomena, the increased production of the well is generally sustained for a comparatively long period after the treatment. Thus, a given volume of acid not only suffices in many instances to bring about greater increases in production than those obtainable with ordinary hydrochloric acid, but also the increase is sustained for a longer time.

The invention, then, consists of the method hereinafter fully described and particularly pointed out in the claims, the following description setting forth in detail certain modes of carrying out the invention, such modes illustrating, however, but various ways in which the principle of the invention may be used.

The treatment contemplated by our process comprises introducing into the well and thence into the surrounding formation an aqueous hydrochloric acid solution in the presence of a relatively small proportion of an organic nitrogen compound of the aforementioned group in amount sufficient to substantially retard the normal rate of the action of hydrochloric acid on calcium carbonate under the pressures encountered in the well. These agents do not have the effect of either inhibiting the action of the acid on metals or of reducing the total amount of limestone which the acid can dissolve. Their only function appears to be to greatly reduce the rate of the action of the acid on limestone, thereby giving rise to the advantageous effects aforementioned, namely, of permitting deep penetration of the acid, creation of long or extended flow channels which in turn has the effect of greatly increasing the output of the well and sustaining this increase for a comparatively long time.

The proportion of the agent to employ in the acid may be from 0.1 or 1 to 5 per cent or more based upon the weight of the acid solution depending upon the solubility of the agent in the acid. We generally prefer to use about 1 per cent of the agent as this amount has proved in practice to be generally satisfactory. The concentration of the hydrochloric acid may be from about 5 to 25 per cent of HCl by weight, although other concentrations may be used. A generally useful acid concentration is about 15 per cent by weight. If desired, an inhibitor of the action of the acid on metals may be included in the solution so as to protect the metal parts of the well from attack by the acid since the agents specified for use in our method, although they inhibit the attack of the acid on limestone, do not have the effect of inhibiting the action of the acid on metals. The introduction of the acid solution into the well and thence into the formation may be carried out in any of the ways known to the art, as for example, those described in U. S. 1,877,504 and 1,891,667.

As illustrative of the effect of the addition of our agents to the acid on its rate of action on limestone, the reaction being carried out at a pressure of about 600 pounds per square inch, tests were made on cylindrical limestone cores 1 inch in diameter and 1 inch long by subjecting them to the action of 13.7 per cent hydrochloric acid with and without the addition of one of the aforesaid retarding agents. The comparative loss in weight of the core was used as a measure of the retarding effect of the added agent. Results of these tests are given in the following table.

Table

| Expt. No. | Retarding agent in 13.7% hydrochloric acid solution | Weight loss in grams per sq. in. per minute at 600 lbs./sq. in | Percent retardation of acid action |
|---|---|---|---|
| 1A | | 0.0585 | 0 |
| 2A | 1% dibutyl amine | 0.0350 | 40.2 |
| 3A | 1% cinchophen | 0.0152 | 74 |
| 4B | | 0.0605 | 0 |
| 5B | 1% nitrobenzene | 0.0410 | 31.7 |
| 6B | 1% p-nitrophenol | 0.0240 | 60 |
| 7C | | 0.0590 | 0 |
| 8C | 1% diphenyl guanidine | 0.0356 | 39.6 |
| 9C | 1% 4-tertiary-butyl-2-nitro-phenol | 0.0363 | 39.5 |
| 10C | 1% 2-chlor-5-nitro-benzoic acid | 0.0332 | 44.6 |
| 11C | 1% 3-nitro-diphenyl ether 2-sulfonic acid | 0.0333 | 44.5 |
| 12D | | 0.0670 | 0 |
| 13D | 1% 2-chlor-nitrobenzene | 0.0445 | 34.0 |
| 14D | 1% 2-nitro-benzoic acid | 0.0392 | 41.0 |
| 15D | 1% ortho-nitro-para-phenete-dine | 0.0254 | 62.0 |

From the table it will be seen that the rate at which hydrochloric acid solution dissolves limestone can be retarded to between 31.7 and 62 per cent of its normal rate of action.

EXAMPLE 1

The following test is illustrative of the effect of the conventional 15 per cent hydrochloric acid treatment of a well on its output compared to that obtained in a similar treatment of a similar well in which 1 per cent of nitrobenzene was added to the acid:

*Conventional treatment*

The well when brought in produced from a highly soluble lime formation at the rate of 400 bbls./day, which declined to about 160 bbls./day in 24 days. At this time the well was conventionally acidized with 3750 gallons of 15 per cent hydrochloric acid solution, whereupon the production increased to 850 bbls./day, which very rapidly declined in 33 days to a production of 112 bbls./day and continued to decline in the next 30 days to about 40 bbls./day, after which the production slowly declined for 25 days to about 30 bbls./day.

*Improved treatment*

An offset well in the same formation was brought in at about the same time with an initial production of about 380 bbls./day, which declined to about 140 bbls./day in 27 days. At this time it was acidized in conventional manner with 750 gallons of 15 per cent hydrochloric acid, whereupon the production increased to 500 bbls./day, which decreased to 380 bbls./day in 5 days. The well was then again acidized with 3000 gallons of 15 per cent hydrochloric acid containing 1 per cent of nitrobenzene, the production thereby being increased to 580 bbls./day. The production then declined in 33 days to 110 bbls./day, but maintained this rate of output for about 31 days, declining gradually in the next 25 days to about 40 bbls./day.

The production of the first well after acidizing declined so rapidly that in 8 days the production rate became 580 bbls. or the same as that of the offset well immediately after acidizing with the acid containing nitrobenzene. Comparing now the rates of production of the two wells over the 90 days following the time that the rates became equal (580 bbls./day) and computing the total output for this period, the conventionally acidized well produced 9800 bbls. of oil, while the nitrobenzene-hydrochloric acid treated well produced 18,300 bbls., or about 87 per cent more oil.

EXAMPLE 2

*Conventional treatment*

The well when brought in produced from a highly soluble lime formation at the rate of 780 bbls./day, but declined rapidly to 160 bbls./day in 28 days, during which period the well produced 10,000 bbls. of oil, showing an average production of 357 bbls./day. The well was then acidized in conventional manner with 1000 gallons of 15 per cent hydrochloric acid which raised the production to 380 bbls./day. In the following 28 days 5860 bbls. of oil were produced, the average output for the period being 208 bbls./day. At the end of this 28 day period the well ceased to produce.

*Improved treatment*

The well in its non-productive state was then acidized with 3000 gallons of 15 per cent hydrochloric acid containing 25 gallons of nitrobenzene, whereupon the production returned to 380 bbls./day. Instead of declining rapidly as it did following the conventional acid treatment the production remained at a comparatively high level, averaging about 278 bbls./day for the next 28 days, declining then to an average of 208 bbls./day for the following 28 days, and then to 171 bbls./day for the next 28 days, giving a total output for the period of 84 days following the nitrobenzene acid treatment of 18,480 bbls. In this instance the effect of the addition of the nitrobenzene to the hydrochloric acid was not only to prolong the useful life of the well, but also to greatly increase the amount of oil it produced in comparison with the relatively small unsustained increase in production obtained by conventional treatment.

The foregoing improved treatment may also be compared with the conventional treatment of the following well which is an offset of it in the same formation and having similar initial characteristics. When brought in its production was 700 bbls./day, declining to no production in 30 days, during which 12,050 bbls. of oil were produced. The well was then acidized in conventional manner with 3000 gallons of 15 per cent hydrochloric acid which increased its production rate to about 200 bbls./day. In the following 84 days a total of 14,100 bbls. of oil were produced, or about 24 per cent less than was produced by the nitrobenzene treated well in the same time after acidizing.

Although the method has been more particularly illustrated by its application to oil wells, it is to be understood that it may be applied to other wells such as those producing water or brine from a calcareous formation.

Other modes of applying the principle of our invention may be employed instead of the one explained, change being made as regards the method herein disclosed, provided the step stated by any of the following claims or the equivalent of such stated step be employed.

We therefore particularly point out and distinctly claim as our invention:

1. In a method of acidizing a well in a calcareous formation with hydrochloric acid, the step which consists in introducing into the well and thence into the formation aqueous hydrochloric acid solution to which has been added a relatively small proportion of an organic aromatic nitrogen compound selected from the group consisting of cinchophen, nitrobenzene, p-nitrophenol, diphenyl guanidine, 4-tertiary-butyl-2-nitrophenol, 2-chlor-5-nitro benzoic acid, 3-nitro-diphenyl ether 2 sulfonic acid, 2-chlor-nitrobenzene, 2 nitro benzoic acid, ortho-nitro-para phenetedine.

2. In a method of acidizing a well in a calcareous formation with hydrochloric acid, the step which consists in introducing into the well and thence into the formation aqueous hydrochloric acid solution to which is added between about 0.1 and 5 per cent nitrobenzene.

3. In a method of acidizing a well in a calcareous formation with hydrochloric acid, the step which consists in introducing into the well and thence into the formation aqueous hydrochloric acid solution to which is added between about 0.1 and 1 per cent of cinchophen.

4. In a method of acidizing a well in a calcareous formation with hydrochloric acid, the step which consists in introducing into the well and thence into the formation aqueous hydrochloric acid solution to which is added between about 0.1 and 5 per cent of ortho-nitro-para phenetedine.

JOHN B. STONE.
PAUL G. SHELLEY.